United States Patent [19]

Hermansen et al.

[11] Patent Number: 5,350,779
[45] Date of Patent: Sep. 27, 1994

[54] LOW EXOTHERM, LOW TEMPERATURE CURING, EPOXY IMPREGNANTS

[75] Inventors: Ralph D. Hermansen, Northridge; Steven E. Lau, Los Angeles, both of Calif.

[73] Assignee: Hughes Aircraft Company, Los Angeles, Calif.

[21] Appl. No.: 85,244

[22] Filed: Jun. 29, 1993

Related U.S. Application Data

[63] Continuation of Ser. No. 810,640, Dec. 19, 1991, abandoned.

[51] Int. Cl.$^5$ .............................. C08L 63/02
[52] U.S. Cl. .................................. 523/428
[58] Field of Search .................. 523/404, 428

[56] References Cited

U.S. PATENT DOCUMENTS

| | | | | |
|---|---|---|---|---|
| 4,798,761 | 1/1989 | Wykowski et al. | ............... | 525/122 |
| 4,798,761 | 1/1989 | Wykowski et al. | ............... | 525/122 |

OTHER PUBLICATIONS

C. A. May ed. Epoxy Resins, 1988, pp. 470 & 471.

*Primary Examiner*—Melvyn I. Marquis
*Assistant Examiner*—D. Aylward
*Attorney, Agent, or Firm*—M. E. Lachman; M. W. Sales; W. K. Denson-Low

[57] ABSTRACT

Epoxy-type impregnating compounds, which are useful for electrical potting or encapsulation, plastic tooling, and fiber-reinforced composites, comprise a resin component and a stoichiometric amount of a curative and have a curing temperature of less than about 120° F. (49° C.). The resin component is the diglycidyl ether of bisphenol A, either alone or as a mixture with up to about 15 wt % of at least one reactive monoepoxide diluent or up to about 50 wt % of at least one reactive diepoxide diluent, the diluent having a viscosity of less than about 200 cp. The curative is a mixture of cycloaliphatic diamines, comprising from about 20 to 80 wt % of at least one sterically-hindered cycloaliphatic diamine and the balance at least one sterically-unhindered cycloaliphatic diamine. These epoxy compounds are unique because they can be handled in relatively large bulk without concern for dangerous runaway exotherms. In addition, they result in useful products with a moderate service temperature range, without the necessity of high temperature cures. The advantages of the low temperature cure are lower residual stress in the cured product, better dimensional control in molding, and lower energy expenditure.

10 Claims, 3 Drawing Sheets

LOW EXOTHERM, LOW TEMPERATURE CURING, EPOXY IMPREGNANTS

This invention was made with United States Government support under Contract No. CDR 50-22585. The U.S. Government has certain rights in this invention.

This is a continuation of application Ser. No. 07/810,640, filed Dec. 19, 1991, now abandoned.

BACKGROUND OF THE INVENTION

1. Field of the Invention

The present invention relates generally to epoxy-type impregnating compounds, which are useful for electrical potting or encapsulation, plastic tooling, and fiber-reinforced composites. More particularly, the present invention relates to epoxy impregnants having a low exotherm and a low temperature cure.

2. Description of Related Art

In the fabrication of electronic devices and circuits, the electronic devices are protected from the adverse effects of the environment by filling the empty spaces between components on the device with a polymeric material which encapsulates these components. If the electronic device is used outdoors, such as in automobiles, aircraft, marine, or building applications, the potting material or encapsulant must provide protection over extreme outdoor temperature and humidity conditions.

Present high voltage potting and encapsulation, such as for high voltage power supplies, involves the use of epoxy materials having curing temperatures on the order of 160° F. (71° C.). Yet, while stress analysis has indicated that a lower cure temperature would reduce critical stress levels, such materials are not currently available. An example of such a system is a formulation of EPON 815 (a mixture of diglycidyl ether of bisphenol A and a monoepoxide diluent of butyl glycidyl ether, available from Shell Chemical Company) and menthane diamine. This formulation is safe from an exotherm standpoint, develops suitable mechanical and electrical properties, and functions well as an encapsulant; however, it must be cured at temperatures of 160° F. (71° C.) and higher, which results in the creation of a residual stress condition upon cooling to room temperature.

Most epoxy compounds, which are capable of being fully cured at low cure temperatures (defined herein as less than about 120° F., or about 49° C.), also have a propensity towards generation of high exotherm temperatures due to polymerization reactions. Such release of heat can become an unacceptably dangerous situation from the standpoints of worker safety and fire prevention. Generally, for epoxy resin/curative mixtures, the peak exotherm reaches ever higher temperatures as the volume of compound is increased. Temperatures exceeding the decomposition temperature of some epoxy compounds are reached in large masses with catastrophic results.

A need exists for a family of epoxy formulations that cure at low temperatures and generate modest, acceptable exotherms.

SUMMARY OF THE INVENTION

In accordance with the invention, a family of epoxy formulations, which are defined within a range of curative mixtures, is provided that cure at low temperatures (less than about 120° F., or about 49° C.) and generate modest, acceptable exotherms. Furthermore, the mixed compounds are sufficiently low in viscosity to be suitable for impregnating particulate grids, fiber bundles, and cloth weaves.

The resin component is the diglycidyl ether of bisphenol A (DEGBA) or mixtures of DEGBA and reactive diluents such as the monoepoxides or the low viscosity diepoxides. The resin component may contain up to about 15 wt % of the monoepoxide diluents or up to about 50 wt % of the diepoxide diluents.

The curative, which is present in stoichiometric amount relative to the resin component, comprises a mixture of cycloaliphatic diamines such that at least one curative ingredient is a sterically-hindered cycloaliphatic diamine and at least one other curative ingredient is a sterically-unhindered cycloaliphatic diamine. The curative contains about 20 to 80% of the sterically-unhindered diamine and the balance the sterically-hindered diamine.

The proportions of the curative ingredients may be varied to reduce the exotherm temperature with increasing sterically-hindered curative or to decrease the cure temperature with increasing sterically-unhindered curative.

The family of epoxy-type impregnating compounds disclosed herein is useful for electrical potting or encapsulation, plastic tooling, and fiber-reinforced composites. These epoxy compounds are unique because they can be handled in relatively large bulk without concern for dangerous runaway exotherms. In addition, they result in useful products with a moderate service temperature range, without the necessity of high temperature cures. Cure temperatures as low as 100° F. (38° C.) may be employed. The advantages of such low temperature cures are lower residual stress in the cured product, better dimensional control in molding, and lower energy expenditure.

DESCRIPTION OF THE PREFERRED EMBODIMENTS

Figure 1:
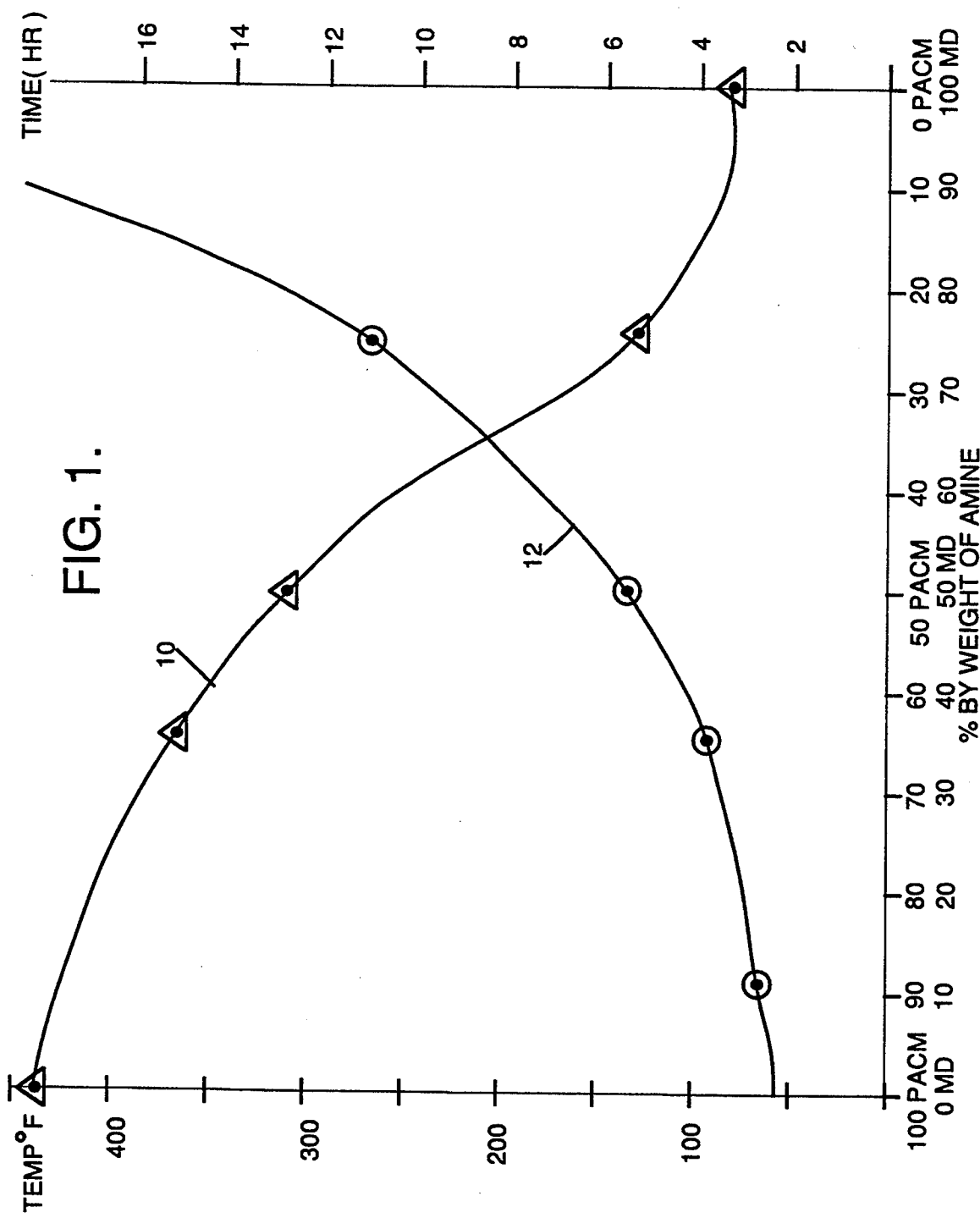
FIG. 1, on coordinates of temperature in °F. (left abscissa) or time in hours (right abscissa) and concentration of amine in weight percent (wt %), is a plot of the exotherm temperature and time to peak exotherm as a function of formulation.

In accordance with the invention, a family of epoxy formulations, which are defined within a range of curative mixtures, cure at low temperatures (less than about 120° F., or about 49° C.) and generate modest, acceptable exotherms. Furthermore, the mixed compounds are sufficiently low in viscosity to be suitable for impregnating particulate grids, fiber bundles, and cloth weaves.

The invention is a new family of epoxy-type impregnating compounds, which are useful for electrical potting or encapsulation, plastic tooling, and fiber-reinforced composites. These epoxy compounds are unique because they can be handled in relatively large bulk without concern for dangerous runaway exotherms. In addition, they result in useful products with a moderate service temperature range (less than about 500° F., or about 260° C.), without the necessity of high temperature cures. Cure temperatures as low as 100° F. (38° C.) may be employed. The advantages of such low temperature cures are lower residual stress in the cured product, better dimensional control in molding, and lower energy expenditure.

The formulation of the invention comprises a resin component and a stoichiometric amount of a curative. A stoichiometric amount of curative is based on one active hydrogen (H) to each epoxy group; an active H is one attached to a nitrogen atom. Up to about ±10% variation from stoichiometry of the curative may be employed in the practice of the invention. Other components, such as fillers, may also be added, as is well-known in the art.

The resin component is the diglycidyl ether of bisphenol A, either alone or as a mixture with at least one reactive diluent, such as a monoepoxide or a diepoxide. The epoxides suitably employed as diluents have a viscosity less than about 200 centipoise (cp), and are considered to be "low viscosity" epoxides.

The function of the diluent is to lower the viscosity of the mixed resin system to improve its flow for impregnation, encapsulation, etc. The viscosity of the mixed resin system should be maintained below about 10,000 cp in order to maximize its utility in these applications.

A maximum of up to about 15 wt % of the monoepoxide diluent(s) may be employed. Greater than about 15 wt % of the monoepoxide diluent(s) results in an unacceptable decrease in physical properties, such as tensile strength, of the finished product.

A maximum of up to about 50 wt % of the diepoxide diluent(s) may be employed. Greater than about 50 wt % of the diepoxide diluent(s) results in an unacceptable decrease in electrical properties, such as electrical resistance, of the finished product.

Examples of monoepoxides suitably employed in the practice of the invention include butyl glycidyl ether, phenyl glycidyl ether, and cresyl glycidyl ether. Examples of low viscosity diepoxides suitably employed in the practice of the invention include the diglycidyl ether of 1,4-butane diol, the diglycidyl ether of resorcinol, and the diglycidyl ether of neo-pentyl glycol.

The curative is a mixture of cycloaliphatic diamines, comprising at least one sterically-hindered cycloaliphatic diamine and at least one sterically-unhindered cycloaliphatic diamine. A sterically-hindered diamine is one that contains bulky side-groups, which prevent rapid reaction with the epoxy resin.

An example of sterically-hindered cycloaliphatic diamines suitably employed in the practice of the invention is menthane diamine. Other cyclohexyl and dicyclohexyl diamines having one or both diamine groups shielded by bulky groups to restrict the angular zone for impact between the amino and the epoxy groups to react may also be used.

Examples of sterically-unhindered cycloaliphatic diamines suitably employed in the practice of the invention include bis-4,4'-(para-amino-cyclohexyl-methane), 1,3-diaminocyclohexane, isophoronediamine, and m-xylylenediamine. The compound m-xylylenediamine, although it is aromatic, behaves like a cyclic aliphatic compound, since the $-CH_2-$ group isolates the $-NH_2$ group from the ring.

The amount of sterically-unhindered cycloaliphatic diamine in the curative ranges from about 20 to 80 wt % of the total curative composition. Less than about 20 wt % results in the curative behaving like a pure sterically-hindered curative; in such a case, full cure at room temperature is never achieved. Greater than about 80 wt % results in the curative behaving like a pure sterically-unhindered curative; in such a case, curing occurs very quickly, with the very real risk of runaway exotherm, especially with large resin/curative volume. A particularly preferred range is about 30 to 70 wt % for the menthane diamine/bis-4,4'-(para-amino-cyclohexyl-methane) system.

Figure 2:
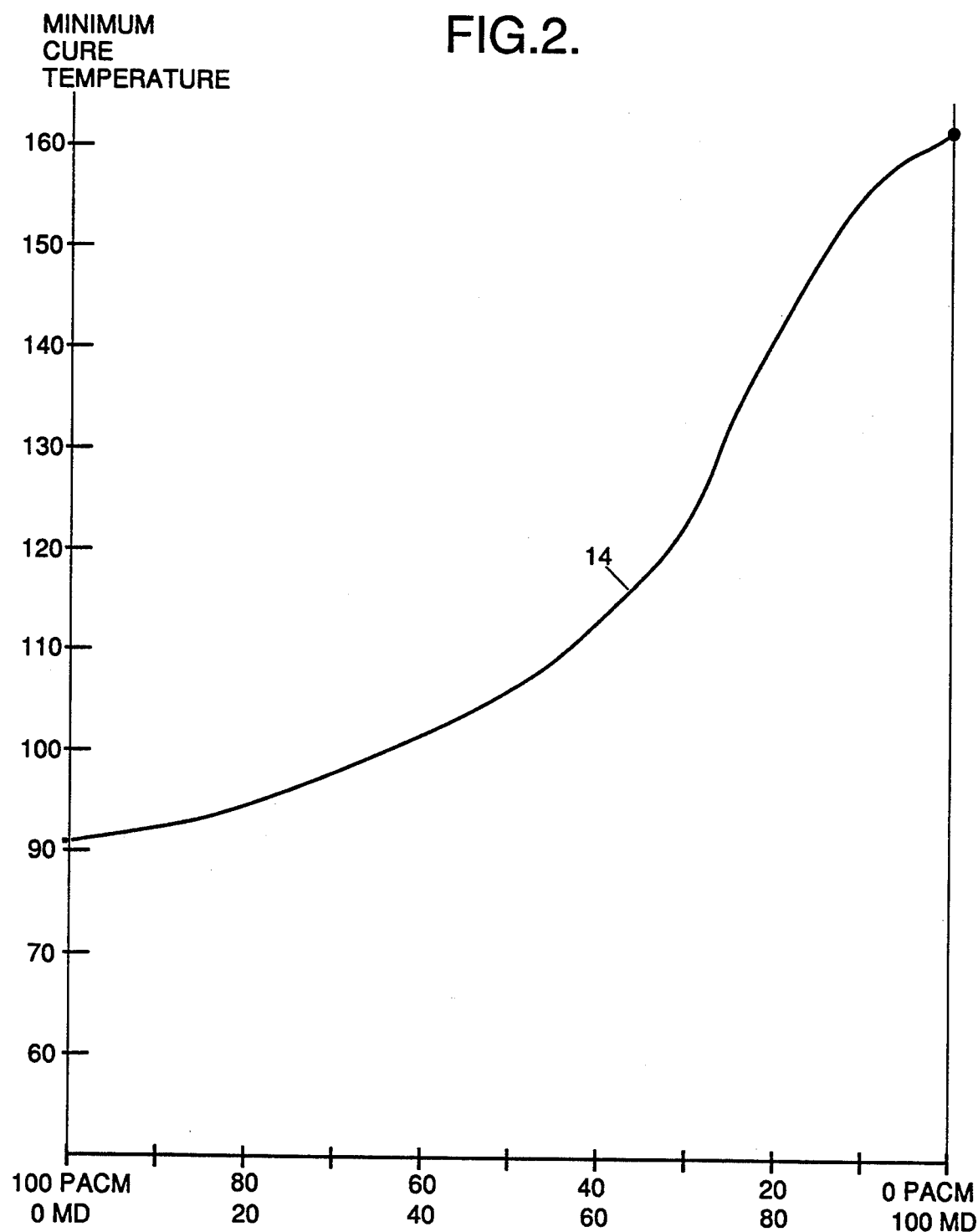
FIG. 2, on coordinates of temperature in °F. and concentration of amine in wt % is a plot of the minimum cure temperature as a function of composition.

An increase in the amount of the sterically-hindered curative reduces the exotherm temperature, while an increase in the amount of the sterically-unhindered curative decreases the cure temperature. FIG. 1 illustrates the change in exotherm temperature (Curve 10) and work life (Curve 12) as a function of the curative formulation. FIG. 2 illustrates how the minimum cure temperature varies as a function of curative composition (Curve 14). In both cases, the curative composition employed mixtures of menthane diamine and bis-4,4'-(para-amino-cyclohexyl-methane).

The particular combination of curatives selected is based upon a need to impart desired mechanical strength, heat stability, and electrical properties, as well as provide processing attributes (e.g., long work life, low viscosity, non-outgassing, etc.). The cure cycle requirement is then dependent on the reactivity of the curative selected.

A mineral filler may be employed in the practice of the invention. Examples of mineral fillers well-known in epoxide systems include oxides, such as alumina and silica, carbonates, such as dolomite, nitrides, such as aluminum nitride, carbides, such as silicon carbide, alumino-silicates, and the like. It will be appreciated that use of a filler will require a consideration of the amount of filler together with balancing the amount of reactive diluent (if used) so as maintain the viscosity of the epoxide system at about 10,000 cp or below. Specific applications dictate the particular viscosity range required, as is well-known.

For impregnation purposes, the filler must have a particle size such that the interstices between particles can be penetrated by the resin/amine. Low viscosity is critical in this instance.

Typically, in impregnation, one or more electrical components are placed in a cavity. Then, in either order, the mineral filler and the impregnating compound are added, and the assembly is then cured. For added strength, glass cloth may be wrapped around certain of the electrical components.

Encapsulants for high voltage devices comprise one important application for this technology. For example, the mold cavity is filled with coarse-size (25 mils, or 0.06 cm, or larger) particles such as alumina, sand, or glass beads, which surround the high voltage device. The epoxy encapsulant is of sufficiently low viscosity (in this application, less than about 2,000 cp) to impregnate the gridwork. Since the present invention permits cures at temperatures much closer to room temperature, stresses are lower.

Figure 3:
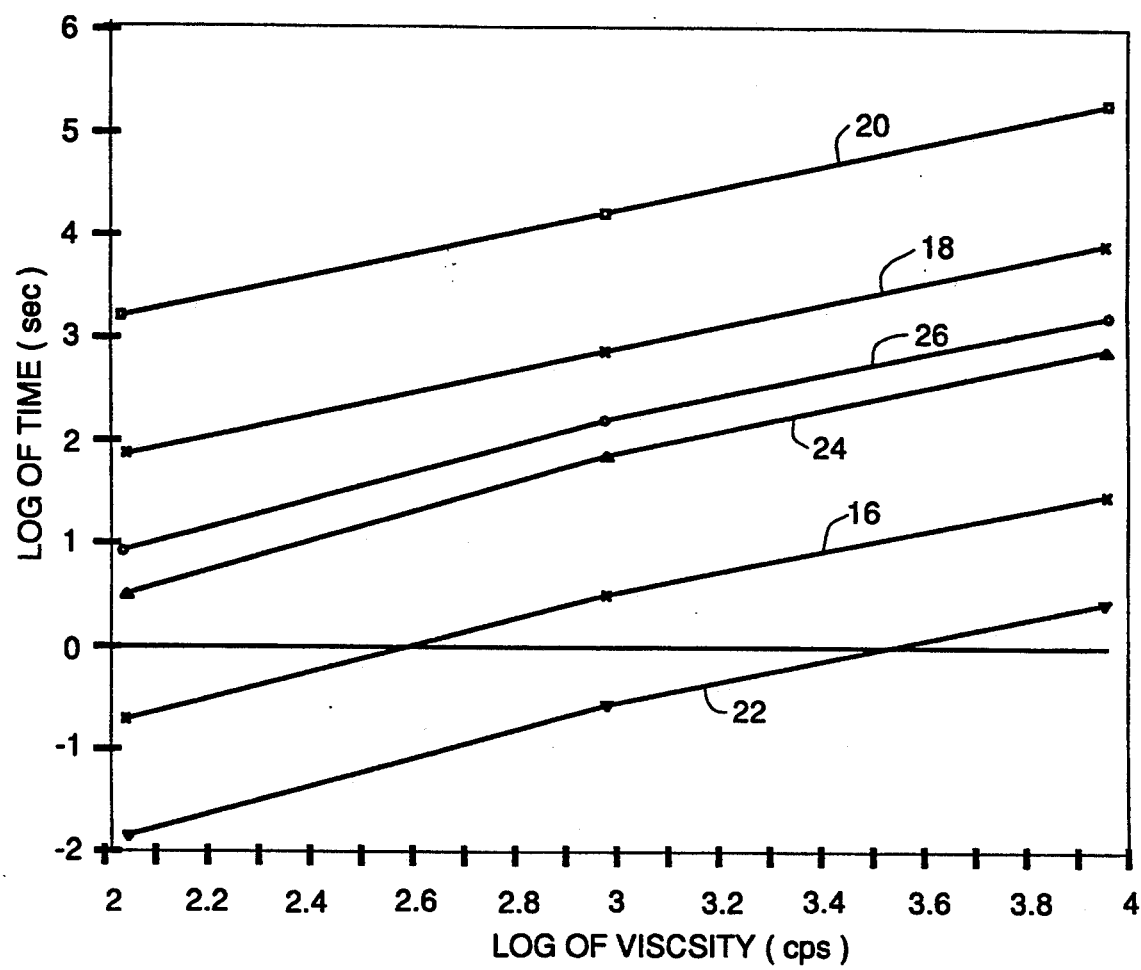
FIG. 3, on coordinates of time in seconds and log of viscosity in centipoise (cp), is a plot of the impregnation time as a function of the log of encapsulation viscosity for various glass bead fillers and alumina powder.

FIG. 3 illustrates how different particle sizes can affect encapsulation viscosity. Curves 16, 18, and 20 represent glass beads at 8 to 12 mesh, 100 to 200 mesh, and greater than 325 mesh, respectively. Curves 22 and 24 represent ceramic spheres at 3 to 7 mesh and 30 to 50 mesh, respectively. Curve 26 represent alumina powder at 325 mesh.

Another application for the epoxy system of the invention is in plastics tooling, where large volumes of epoxy compound must cure without excessive exotherm and the liquid binder is of low viscosity to accept high filler loadings. Low temperature cures maximize dimensional reproduction of the mold cavity.

A third application area is fiber-reinforced plastics composites. Some applications require build-up of layers of dry cloth, felt, or roving to tooling. Then, an impregnation of the build-up is accomplished with the low viscosity epoxy compound. Again, low temperature cures result in best duplication of mold dimensions. Further, low outgassing, which is another benefit of the invention, permits fabrication of spacecraft structures.

EXAMPLES

EXAMPLES 1-6

Resin/curative mixtures were prepared, comprising 100 parts per hundred (phr) EPON 815 (88% diglycidyl ether of bisphenol A; 11 wt % butyl glycidyl ether) resin and 28 phr curative comprising various ratios of menthane diamine (MD) and bis-4,4'-(para-aminocyclohexyl-methane) (PACM) to obtain 500 g batches. No filler was employed. These batches were allowed to exotherm at room temperature while being monitored by thermocouple. As the ratio of PACM to MD decreased, the time-to-exotherm increased and the exotherm temperature decreased. The data from the exotherm curves was used to generate FIG. 1.

The formulations and their viscosity and peak exotherm in ° F. and in hours (for a one pint, or 473 ml, mass) are listed in Table I, below.

TABLE I

| | Formulation and Properties. | | | |
|---|---|---|---|---|
| Example | PACM/MD Ratio | Compound Viscosity (cp) | Peak Exotherm (°F.) | Peak Exotherm (hrs) |
| 1 | 25/75 | 330 | 137 | 10.5 |
| 2 | 37.5/62.5 | 350 | 295 | 7.4 |
| 3 | 50/50 | 360 | 311 | 5.3 |
| 4 | 65/35 | 380 | 362 | 3.9 |

For comparative purposes, two formulations outside the scope of the invention are listed in Table II, below.

TABLE II

| | Formulation and Properties. | | | |
|---|---|---|---|---|
| Example | PACM/MD Ratio | Compound Viscosity (cp) | Peak Exotherm (°F.) | Peak Exotherm (hrs) |
| 5 | 0/100 | 300 | 90 | 25 |
| 6 | 100/0 | 425 | 400 | 0.13 |

EXAMPLES 7-16

Resin/curative mixtures were prepared, comprising 100 phr EPON 828 (100% liquid diglycidyl ether of bisphenol A) resin and various amounts of curative comprising various ratios of menthane diamine (MD) and bis-4,4'-(para-aminocyclohexyl-methane) (PACM) or of MD and m-xylylenediamine (MXDA).

The formulations and their viscosity and peak exotherm in °F. and in hours (for a one pint, or 473 ml, mass) are listed in Tables III and IV, below.

TABLE III

| | Formulation and Properties. | | | |
|---|---|---|---|---|
| Example | PACM/MD Ratio | Compound Viscosity (cp) | Peak Exotherm (°F.) | Peak Exotherm (hrs) |
| 7 | 60/40 | 2350 | 134 | 6.3 |

The amount of curative was 25 phr. No filler was employed.

TABLE IV

| | Formulation and Properties. | | | |
|---|---|---|---|---|
| Example | MXDA/MD Ratio | Compound Viscosity (cp) | Peak Exotherm (°F.) | Peak Exotherm (hrs) |
| 8[a] | 70/30[c] | 1490 | 425 | 3.3 |
| 9[a] | 70/30[d] | 2090 | 301 | 2.8 |
| 10[b] | 50/50[c] | 1320 | 390 | 3.2 |
| 11[b] | 50/50[d] | 1960 | 260 | 3.7 |

Notes:
a = 19 phr curative
b = 20 phr curative
c = 0 filler
d = 50 wt % tabular alumina filler For comparative purposes, five formulations outside the scope of the invention are listed in Table V, below.

TABLE V

| | Formulation and Properties. | | | |
|---|---|---|---|---|
| Example | PACM/MD Ratio | Compound Viscosity (cp) | Peak Exotherm (°F.) | Peak Exotherm (hrs) |
| 12[a] | 100/0[c] | 2650 | 452 | 2.1 |
| 13[a] | 100/0[d] | 4600 | 308 | 2.4 |
| 14[a] | 100/0[e] | 6800 | 234 | 3.0 |
| 15[a] | 100/0[f] | 25000 | 120 | 5.5 |
| 16[b] | 0/100[c] | 2450 | 91 | 20 |

Notes:
a = 27.5 phr curative
b = 22 phr curative
c = 0 filler
d = 50 wt % tabular alumina filler
e = 100 wt % tabular alumina filler
f = 200 wt % tabular alumina filler Thus, there have been disclosed epoxy-type impregnating compounds, which are useful for electrical potting or encapsulation, plastic tooling, and fiber-reinforced composites. It will be readily apparent to those skilled in the art that various changes and modifications of an obvious nature may be made, and all such changes and modifications are considered to fall within the scope of the invention, as defined by the appended claims.

What is claimed is:

1. An impregnating compound, consisting of for encapsulating high voltage devices and electrical components in a cavity filled with a mineral filler, said impregnating compound consisting essentially of, by weight:
    (a) a resin component consisting essentially of the diglycidyl ether of bisphenol A and at least one reactive diluent selected from the group consisting of (a) from 0 to about 15 wt % of reactive monoepoxide diluents and (b) from 0 to about 50 wt % of reactive diepoxide diluents, said at least one reactive diluent having a viscosity less than about 200 centipoise;
    (b) a stoichiometric amount of a curative comprising a mixture of cycloaliphatic diamines, with from about 20 to 80 wt % of the curative consisting essentially of at least one sterically-unhindered cycloaliphatic diamine and the balance at least one sterically-hindered cycloaliphatic diamine, said impregnating compound having a cure temperature of less than about 120° F. (49° C.) and an exotherm that avoids runaway conditions.

2. The impregnating compound of claim 1 wherein said monoepoxide diluents are selected from the group consisting of butyl glycidyl ether, phenyl glycidyl ether, and cresyl glycidyl ether.

3. The impregnating compound of claim 1 wherein said diepoxides are selected from the group consisting of the diglycidyl ether of 1,4-butane diol, the diglycidyl ether of resorcinol, and the diglycidyl ether of neo-pentyl glycol.

4. The impregnating compound of claim 1 wherein said sterically-hindered cycloaliphatic diamine comprises menthane diamine.

5. The impregnating compound of claim 1 wherein said sterically-unhindered cycloaliphatic diamine is selected from the group consisting of bis-4,4'-(para-amino-cyclohexyl-methane), 1,3-diaminocyclohexane, isophoronediamine, and m-xylylenediamine.

6. The impregnating compound of claim 1 wherein said reactive diluent consists essentially of butyl glycidyl ether and said curative consists essentially of about 25 to 75 wt % of a sterically-hindered cycloaliphatic diamine consisting essentially of menthane diamine and the balance a sterically-unhindered cycloaliphatic diamine consisting essentially of bis-4,4'-(para-amino-cyclohexyl-methane).

7. The impregnating compound of claim 1 wherein said mineral filler is selected from the group consisting of oxides, carbonates, nitrides, and alumino-silicates.

8. The impregnating compound of claim 7 wherein said mineral filler is selected from the group consisting of alumina, silica, dolomite, aluminum nitride, and silicon carbide.

9. The impregnating compound of claim 1 wherein said mineral filler has a particle size of at least about 0.06 cm for encapsulating high voltage devices.

10. The impregnating compound of claim 1 wherein said mineral filler has a particle size of at least about 325 mesh for encapsulating electrical components.

* * * * *